(12) United States Patent
Kume

(10) Patent No.: US 8,106,985 B2
(45) Date of Patent: Jan. 31, 2012

(54) SOLID STATE IMAGING APPARATUS

(75) Inventor: Atsuko Kume, Sagamihara (JP)

(73) Assignee: Olympus Corporation, Tokyo (JP)

( * ) Notice: Subject to any disclaimer, the term of this patent is extended or adjusted under 35 U.S.C. 154(b) by 498 days.

(21) Appl. No.: 12/408,446

(22) Filed: Mar. 20, 2009

(65) Prior Publication Data
US 2009/0244338 A1 Oct. 1, 2009

(30) Foreign Application Priority Data
Mar. 26, 2008 (JP) .................................. 2008-79520

(51) Int. Cl.
*H04N 3/14* (2006.01)
*H04N 5/335* (2011.01)
*H01L 27/00* (2006.01)
(52) U.S. Cl. ..................................... 348/308; 250/208.1
(58) Field of Classification Search .................. 348/308, 348/241, 243; 250/208.1
See application file for complete search history.

(56) References Cited

U.S. PATENT DOCUMENTS
2006/0243885 A1* 11/2006 Watanabe .................. 250/208.1

FOREIGN PATENT DOCUMENTS
JP 2006-287879 A 10/2006

* cited by examiner

*Primary Examiner* — Alicia M Harrington
(74) *Attorney, Agent, or Firm* — Westerman, Hattori, Daniels & Adrian, LLP

(57) ABSTRACT

A solid-state imaging apparatus including: a pixel section having a first pixel shielded from light and a second pixel provided in a region over which an object image is formed; a delay circuit having delay devices connected into a multiple of stages for giving to a running pulse a delay amount corresponding to a difference between an analog output value of each pixel from the pixel section and an analog reference value; an encoder to be reset by the unit of pixel with sampling and encoding a running position of the pulse at every predetermined timing; a first storage section for retaining an encoded value corresponding to the first pixel; a second storage section for retaining an encoded value corresponding to the second pixel; and a differential circuit for computing and outputting as a digital pixel signal a difference between an output from the first storage section and an output from the second storage section.

4 Claims, 10 Drawing Sheets

SOLID STATE IMAGING APPARATUS

This application claims benefit of Japanese Patent Application No. 2008-79520 filed in Japan on Mar. 26, 2008, the contents of which are incorporated by this reference.

BACKGROUND OF THE INVENTION

The present invention relates to solid-state imaging apparatus, and more particularly relates to the solid-state imaging apparatus for example for use in a digital camera, digital video camera, endoscope, etc.

In recent years, size reduction and power saving of the digital camera/digital video camera or of the endoscope are advanced, making a corresponding size reduction and power saving inevitable of the solid-state imaging apparatus to be used in these. To achieve such a reduction in size and power consumption, solid-state imaging apparatus having an AD conversion circuit formed of digital circuits have been proposed for example in Japanese Patent Application Laid-Open 2006-287879.

FIG. 1 is a block diagram schematically showing construction of a prior-art solid-state imaging apparatus.

In this solid-state imaging apparatus, a pixel section is formed with arranging two-dimensionally or in the illustrated example into 4 rows by 5 columns the array blocks (subarray) B1, B2, . . . each containing a pixel block 901 where pixel cells having photoelectric conversion device for outputting pixel signal corresponding to incident light amount are two-dimensionally arranged into an array and an AD converter 902 for AD-converting the pixel signal from the pixel block 901.

FIG. 2 is a block diagram showing an example of the circuit construction of the AD converter 902 in FIG. 1. The AD converter 902 includes a delay circuit 911 having delay devices connected into a multiple of stages for giving a delay amount corresponding to input voltage to a running pulse, and an encoder 910 for sampling and encoding the running position of such pulse at every predetermined timing. More particularly, the delay circuit 911 is formed into the manner of a ring so that an output of a predetermined stage of the delay devices is an input to the first stage, and the output of the final stage becomes an input to a counter 912. Further, the encoder 910 more particularly includes the counter circuit 912 for counting the number of times of circulation of the pulse within the delay circuit 911, a latch and encoder circuit 913 for detecting the number of stage at which the running pulse is within the delay circuit 911, and an adder 914 for adding together an output value of the latch and encoder circuit 913 and an output value of the counter circuit 912. An output value from the adder 914 is outputted as an output of the AD converter 902 so as to generate a digital value corresponding to an input voltage according to an input signal. In this case, pixel signals are inputted as input signal.

SUMMARY OF THE INVENTION

In a first aspect of the invention, there is provided a solid-state imaging apparatus including: a pixel section having a first pixel shielded from light and a second pixel provided in a region over which an object image is formed; a delay circuit having delay devices connected into a multiple of stages for giving to a running pulse a delay amount corresponding to a difference between an analog output value of each pixel from the pixel section and an analog reference value; an encoder to be reset by the unit of pixel with sampling and encoding a running position of the pulse at every predetermined timing; a first storage section for retaining an encoded value corresponding to the first pixel; a second storage section for retaining an encoded value corresponding to the second pixel; and a differential circuit for computing and outputting as a digital pixel signal a difference between an output from the first storage section and an output from the second storage section.

In a second aspect of the invention, the first storage section in the solid-state imaging apparatus according to the first aspect retains a count value obtained by averaging outputs from a plurality of the first pixel.

In a third aspect of the invention, the solid-state imaging apparatus according to the first or second aspect further includes a noise suppressing circuit for outputting an analog signal that noises at the time of resetting the first pixel and the second pixel being suppressed, wherein the analog signal from the noise suppressing circuit is inputted to the delay circuit as the analog output value of each pixel.

In a fourth aspect of the invention, the delay circuit in the solid-state imaging apparatus according to the first or second aspect uses an output at the time of resetting the pixel as the analog reference value and receives a light signal of the pixel corresponding to a light amount of an object as the analog output value.

DESCRIPTION OF THE PREFERRED EMBODIMENTS

Some embodiments of the solid-state imaging apparatus according to the invention will be described below with reference to the drawings.

Embodiment 1

Figure 1:
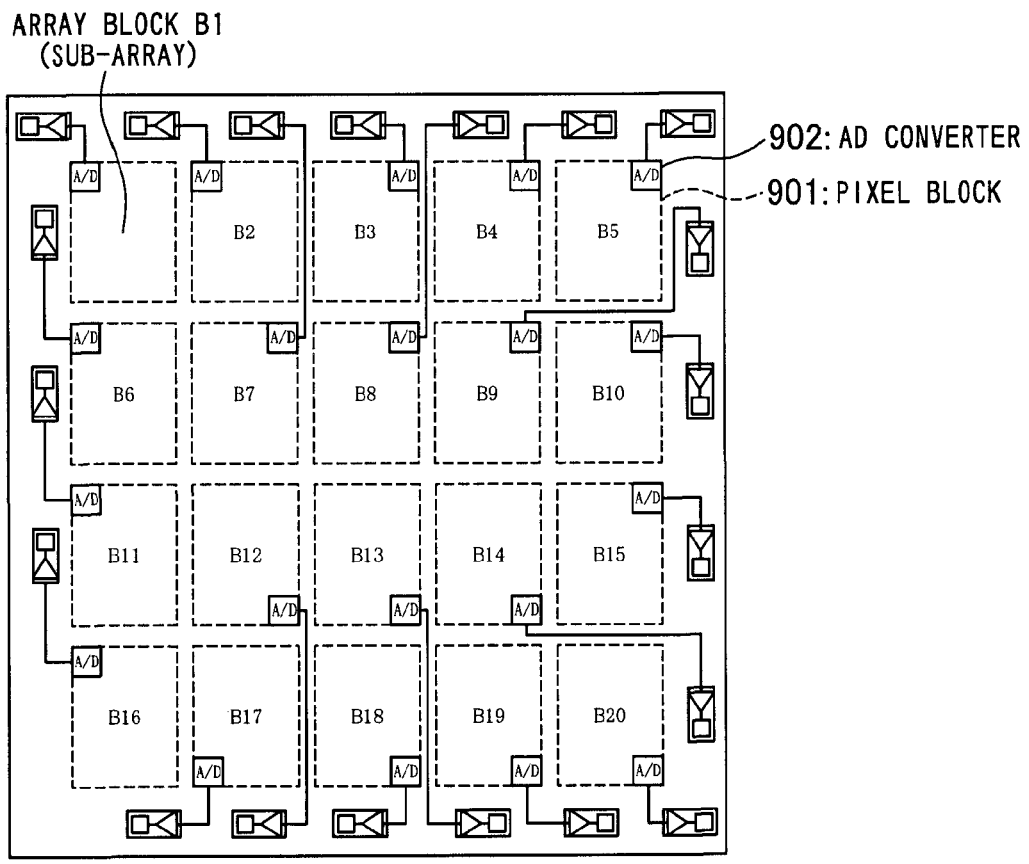
FIG. 1 is a block diagram schematically showing a construction of a prior-art solid-state imaging apparatus.
Figure 2:
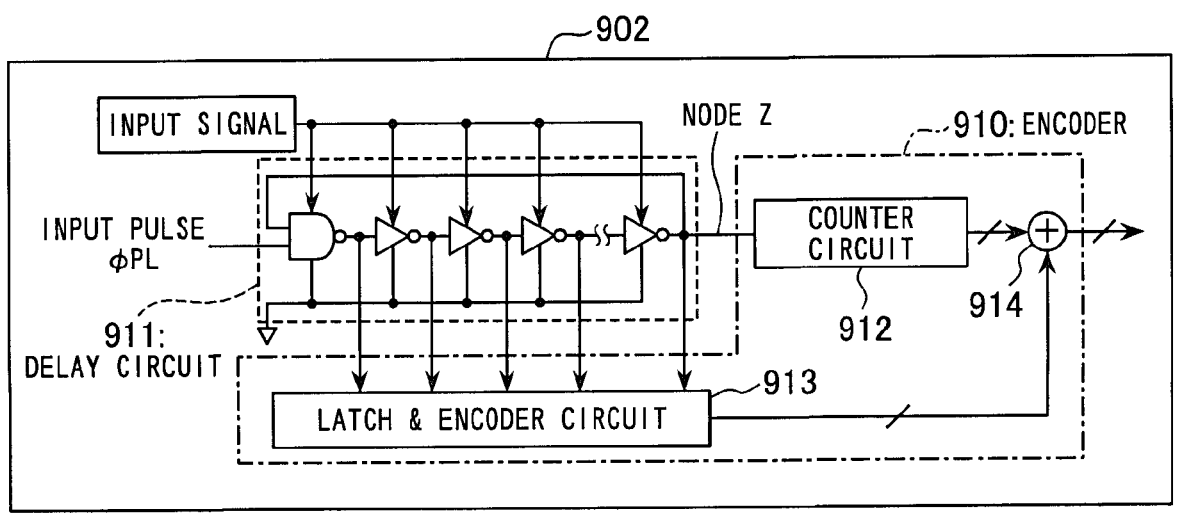
FIG. 2 is a block diagram showing an example of construction of an AD converter in the prior-art example shown in FIG. 1.
Figure 3:
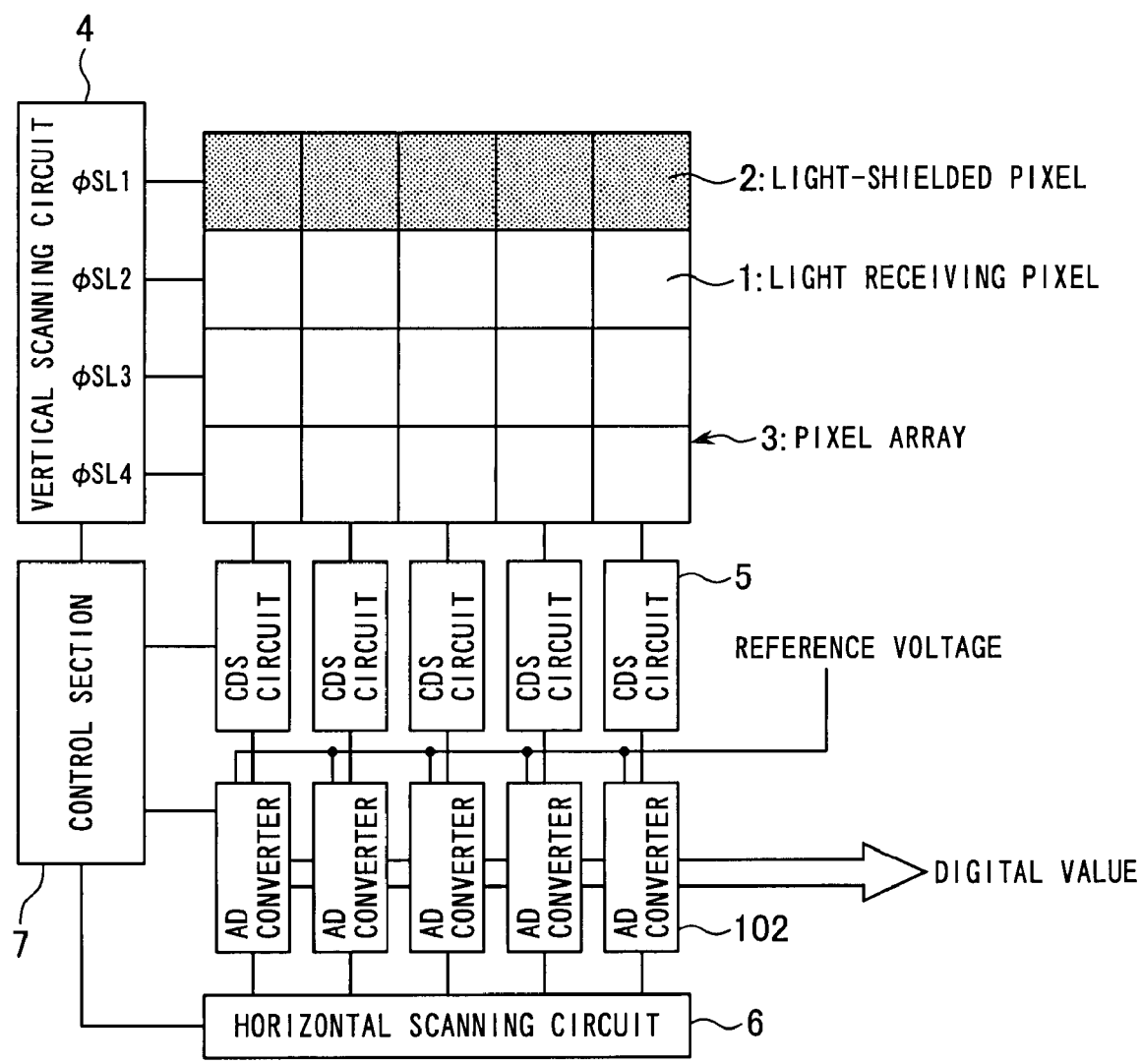
FIG. 3 is a block diagram showing a construction of a first embodiment of the solid-state imaging apparatus according to the invention.

A first embodiment of the solid-state imaging apparatus according to the invention will now be described. FIG. 3 is a block diagram showing a construction of the solid-state imaging apparatus according to the first embodiment. The solid-state imaging apparatus according to the first embodiment includes: a pixel array 3 having a two-dimensional arrangement (4 rows by 5 columns in the illustrated example) of at least light receiving pixels 1 for receiving light and outputting signal and light-shielded pixels 2 of which the portion for receiving light is shielded from light; a vertical scanning circuit 4 for controlling the pixel array 3; a correlation double sampling circuit (CDS circuit) 5 provided column by column for outputting signals that noises at the time of respective reset of the light receiving pixel 1 and the light-shielded pixel 2 are suppressed from the signals outputted from the pixel array 3; an AD converter 102 for effecting analog-to-digital conversion (AD conversion) of the signal outputted from each CDS circuit 5; a horizontal scanning circuit 6 for controlling a reading of signal at the AD converter 102; and a control section 7 for outputting a signal to control the vertical scanning circuit 4, the CDS circuit 5, the horizontal scanning circuit 6, and the AD converter 102.

Figure 4:
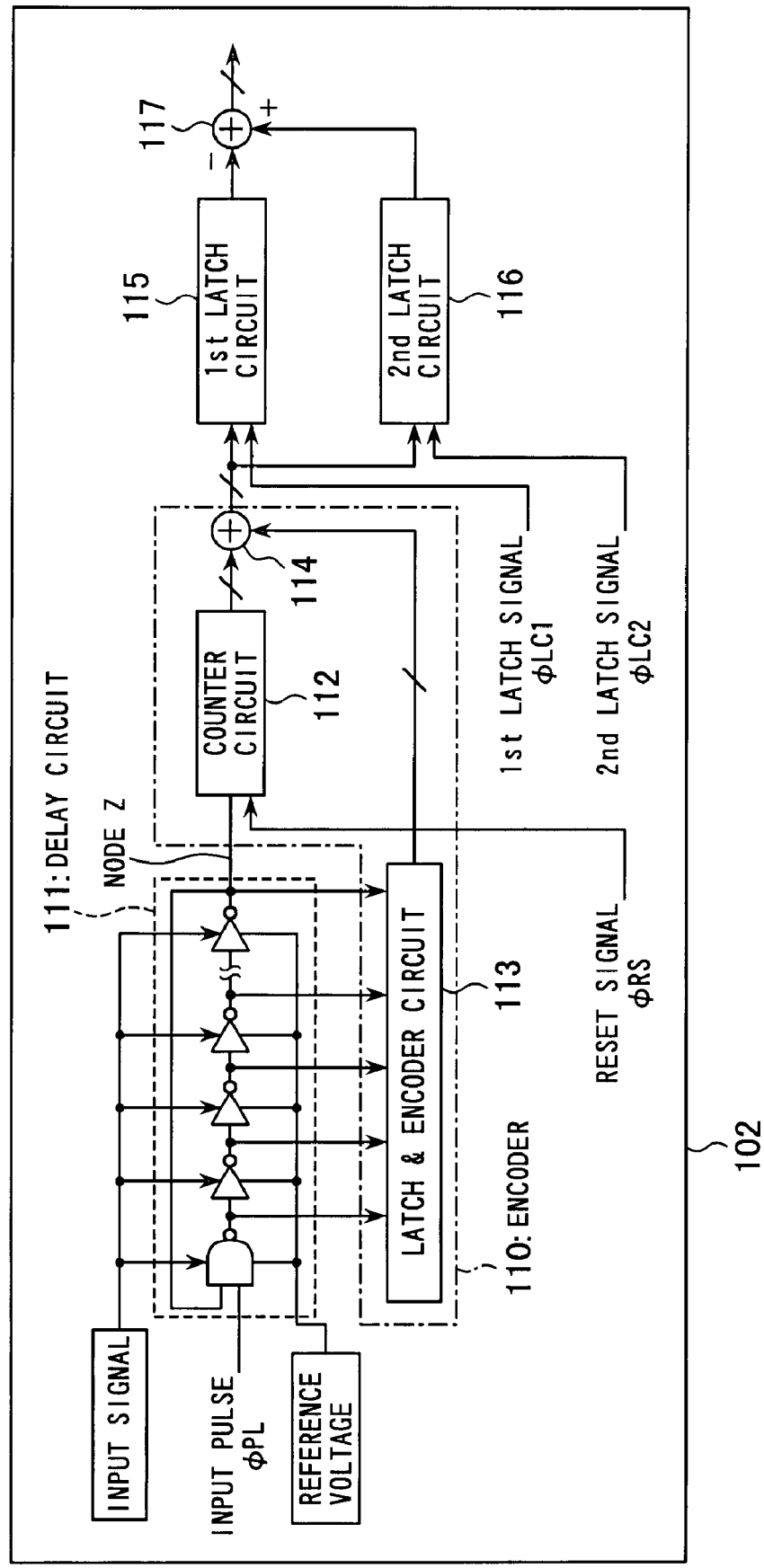
FIG. 4 is a circuit diagram showing a construction of an AD converter in the first embodiment shown in FIG. 3.
Figure 5:
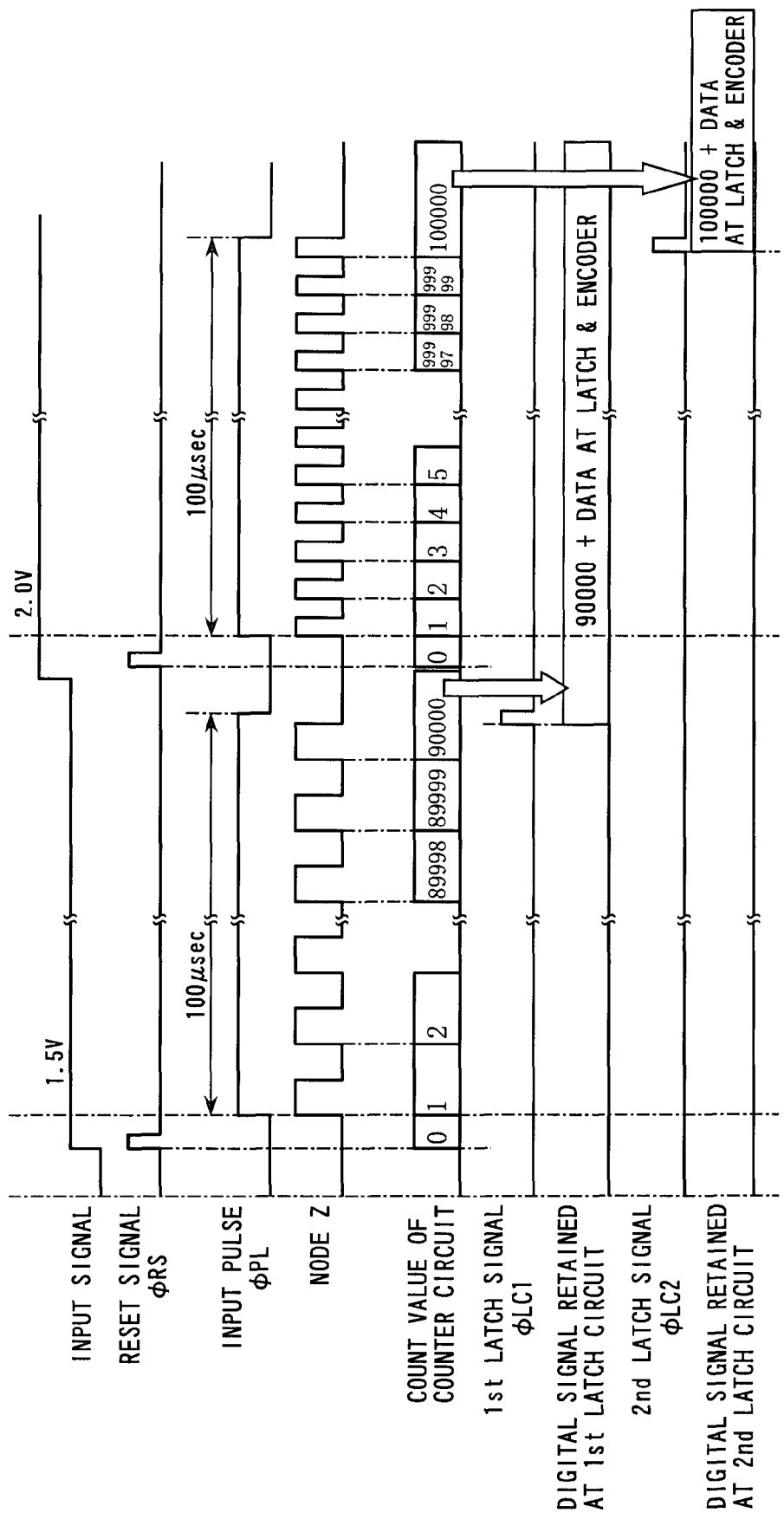
FIG. 5 is a timing chart for explaining an operation of the AD converter shown in FIG. 4.

FIG. 4 is a circuit diagram showing construction of the AD converter 102 in FIG. 3. FIG. 5 is a timing chart for explaining its operation. The construction of the AD converter 102 will first be described by way of FIG. 4. The AD converter 102 has a delay circuit 111 where delay devices are connected into a multiple of stages for giving to a running pulse a delay amount corresponding input voltage (input signal). More particularly, the delay circuit 111 is formed into the manner of a ring so that an output of a predetermined stage of the delay devices is an input to the first stage, and the output of the final stage is an input to a counter 112 to be described next. The AD converter 102 further includes: the counter circuit 112 for counting the number of times the pulse circulated through the delay circuit 111; a latch and encoder circuit 113 for detecting the number of a running stage of the running pulse within the delay circuit 111; an adder 114 for processing an output value of the counter circuit 112 and an output value of the latch and encoder circuit 113 to generate a digital signal corresponding to the input signal; a first latch circuit 115 being a first storage means for retaining a digital signal corresponding to the light-shielded pixel 2 outputted from the adder 114; a second latch circuit 116 being a second storage means for retaining a digital signal corresponding to the light receiving pixel 1 outputted from the adder 114; and an adder 117 for effecting subtraction of the digital signals retained at the first latch circuit 115 and the second latch circuit 116 to generate a digital value. It is to generate a digital value corresponding to the input voltage according to the input signal. It is to be noted that the latch and encoder circuit 113, the counter circuit 112, and the adder 114 constitute an encoder 110. At the encoder 110, the running position of a running pulse within the delay circuit 111 is sampled and encoded at predetermined timings.

Figure 6:
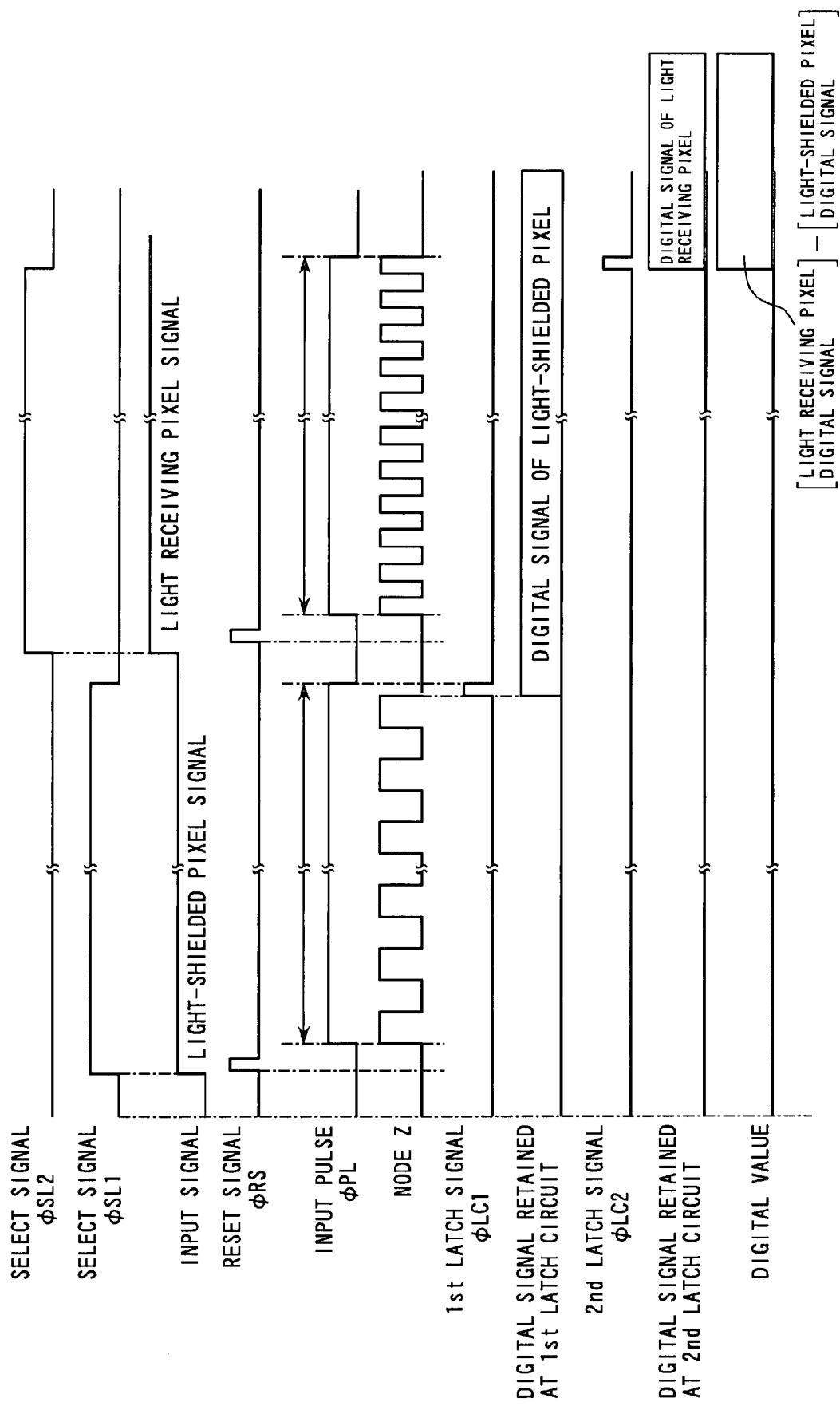
FIG. 6 is a timing chart for explaining an operation of the solid-state imaging apparatus according to the first embodiment shown in FIG. 3.

The operation of the solid-state imaging apparatus constructed as shown in FIG. 3 will now be described with using a timing chart shown in FIG. 6 together with the timing chart for explaining operation of the AD converter 102 shown in FIG. 5. At first, a pixel select signal φSL1 outputted from the vertical scanning circuit 4 attains High level so that the light-shielded pixels 2 of the first row controlled by the pixel select signal φSL1 are selected and the signal of the light-shielded pixel 2 is outputted to the CDS circuit 5. At this time, other pixel select signals φSL2, φSL3, φSL4 are kept at Low level. Signals outputted from the light-shielded pixel 2 are two signals or the signal at the time of resetting that are outputted when the light-shielded pixel 2 is reset and the dark signal after releasing of the reset. At the CDS circuit 5, then, a signal (voltage) with a noise at the time of resetting being suppressed is generated and outputted to the AD converter 102 by computing a difference between the voltages of the two signals.

At the AD converter 102, on the other hand, a reset signal φRS is driven to High level to effect a reset for bringing the counter circuit 112 to initial state, and the reset signal φRS is then brought to Low level to end the resetting to the initial state of the counter circuit 112. Subsequently, an input pulse φPL attains High level, whereby a pulse having a delay amount corresponding to difference from a reference voltage of the voltage of input signal inputted from the CDS circuit 5 based on the input pulse φPL runs through the delay circuit 111.

The counter circuit 112 counts the number of times the running pulse has circulated within the delay circuit 111. At the latch and encoder circuit 113, the number of running stages of the running pulse within the delay circuit 111 is detected. After passage of a certain period (100 μsec in the illustrated example), the running of the pulse in the delay circuit 111 is halted by bringing the input pulse φPL to Low level. Subsequently, the count value counted at the counter circuit 112 and data obtained at the latch and encoder circuit 113 are processed at the adder 114 and are outputted from the adder 114 as a digital signal Dt1 corresponding to an output signal of the light-shielded pixel 2. By driving a first latch signal φLC1 to High level and then bringing it to Low level, the digital signal Dt1 outputted from the adder 114 is retained at the first latch circuit 115. The pixel select signal φSL1 is then brought to Low level to end the reading of signal of the light-shielded pixels 2 of the first row.

Next, by driving a pixel select signal φSL2 from the vertical scanning circuit 4 to High level, the light receiving pixels 1 of the second row controlled by the pixel select signal φSL2 are selected, and signal of the selected light receiving pixel 1 is outputted to the CDS circuit 5. At this time, other pixel select signals φSL1, φSL3, and φSL4 are kept at Low level. Outputted from the light receiving pixel 1 are two signals or the signal at the time of resetting outputted when the light receiving pixel 1 is reset and a light signal corresponding to a received light. At the CDS circuit 5, then, a signal (voltage) with noise at the time of resetting being suppressed is generated and outputted to the AD converter 102 by computing difference between the voltages of the two signals.

At the AD converter 102, then, a reset signal φRS is driven to High level to effect a reset for bringing the counter circuit 112 to initial state, and the reset signal φRS is then brought to Low level to end the resetting to the initial state of the counter circuit 112. Subsequently, an input pulse φPL attains High level, whereby a pulse having a delay amount corresponding to difference from a reference voltage of the voltage of input signal inputted from the CDS circuit 5 based on the input pulse φPL runs through the delay circuit 111.

The counter circuit 112 counts the number of times the running pulse has circulated within the delay circuit 111. At the latch and encoder circuit 113, the number of running stages of the running pulse within the delay circuit 111 is detected. After passage of a certain period (100 μsec in the illustrated example), the running of the pulse in the delay circuit 111 is halted by bringing the input pulse φPL to Low level. Subsequently, the count value counted at the counter circuit 112 and data obtained at the latch and encoder circuit 113 are processed at the adder 114 and are outputted from the adder 114 as a digital signal Dt2 corresponding to an output signal of the light receiving pixel 1. By driving a second latch signal φLC2 to High level and then bringing it to Low level, the digital signal Dt2 outputted from the adder 114 is retained at the second latch circuit 116.

Subsequently, the digital signal Dt1 retained at the first latch circuit 115 and the digital signal Dt2 retained at the second latch circuit 116 are subjected to subtraction at the adder 117, and a difference signal thereof (Dt2−Dt1) is outputted in the order of columns selected by the horizontal scanning circuit 5 as a digital value of the light receiving pixel, i.e. an output from the AD converter 102. By subtracting data of the light-shielded pixel 2 from data of the light receiving pixel 1 in this manner, the black level of image is uniformed so that an excellent image can be obtained.

As the above, since the reset signal φRS is applied pixel by pixel on the counter circuit 112 at the AD converter 102, the bit number of the counter circuit 112, the first latch circuit 115 and the second latch circuit 116 can be kept smaller so that it is possible to reduce the size of the solid-state imaging apparatus.

Embodiment 2

Figure 7:
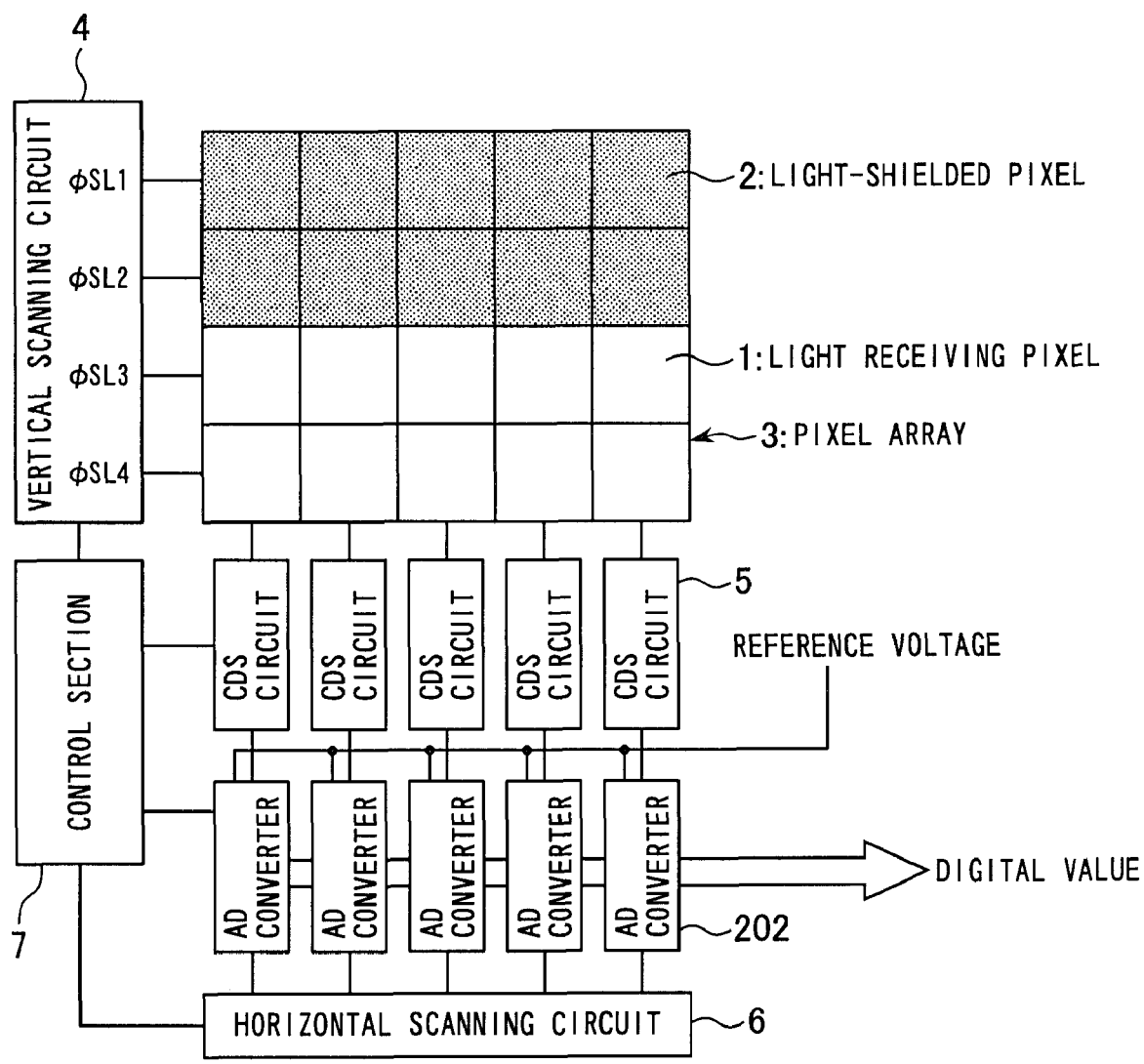
FIG. 7 is a block diagram showing a construction of the solid-state imaging apparatus according to a second embodiment of the invention.
Figure 8:
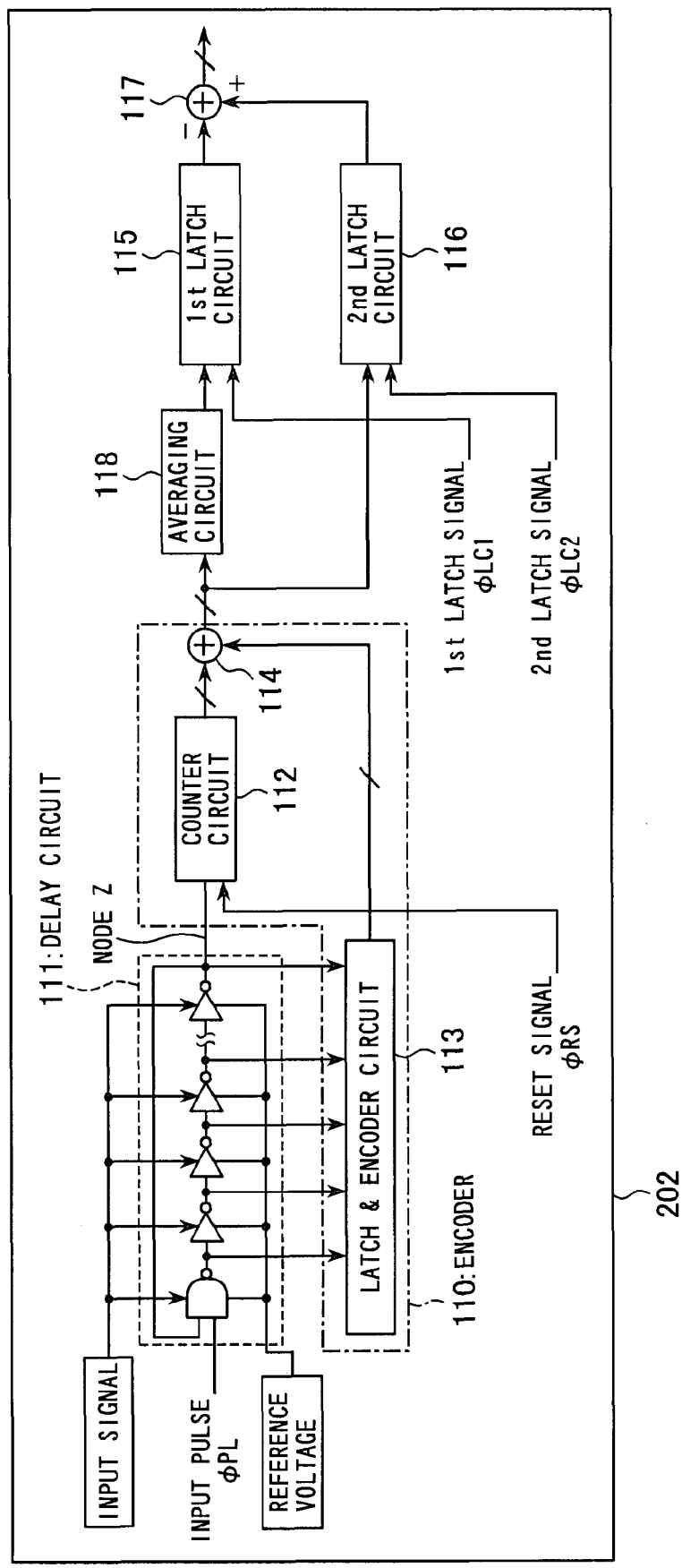
FIG. 8 is a circuit diagram showing a construction an AD converter in the second embodiment shown in FIG. 7.

A second embodiment of the invention will now be described. FIG. 7 is a block diagram showing construction of the solid-state imaging apparatus according to the second embodiment; it is different from the first embodiment shown in FIG. 3 in that the construction of the AD converter is as shown in FIG. 8 and that the number of row of the light-shielded pixel 2 is a plural (2 rows). The construction of the rest is identical to the first embodiment and will not be described. FIG. 8 is a circuit diagram showing construction of the AD converter 202 of the present embodiment. As compared to the AD converter 102 of the first embodiment shown in FIG. 4, an averaging circuit 118 is added to at an interior of the AD converter. The construction of the rest is identical to the AD converter 102 of the first embodiment and will not be described.

Figure 9:
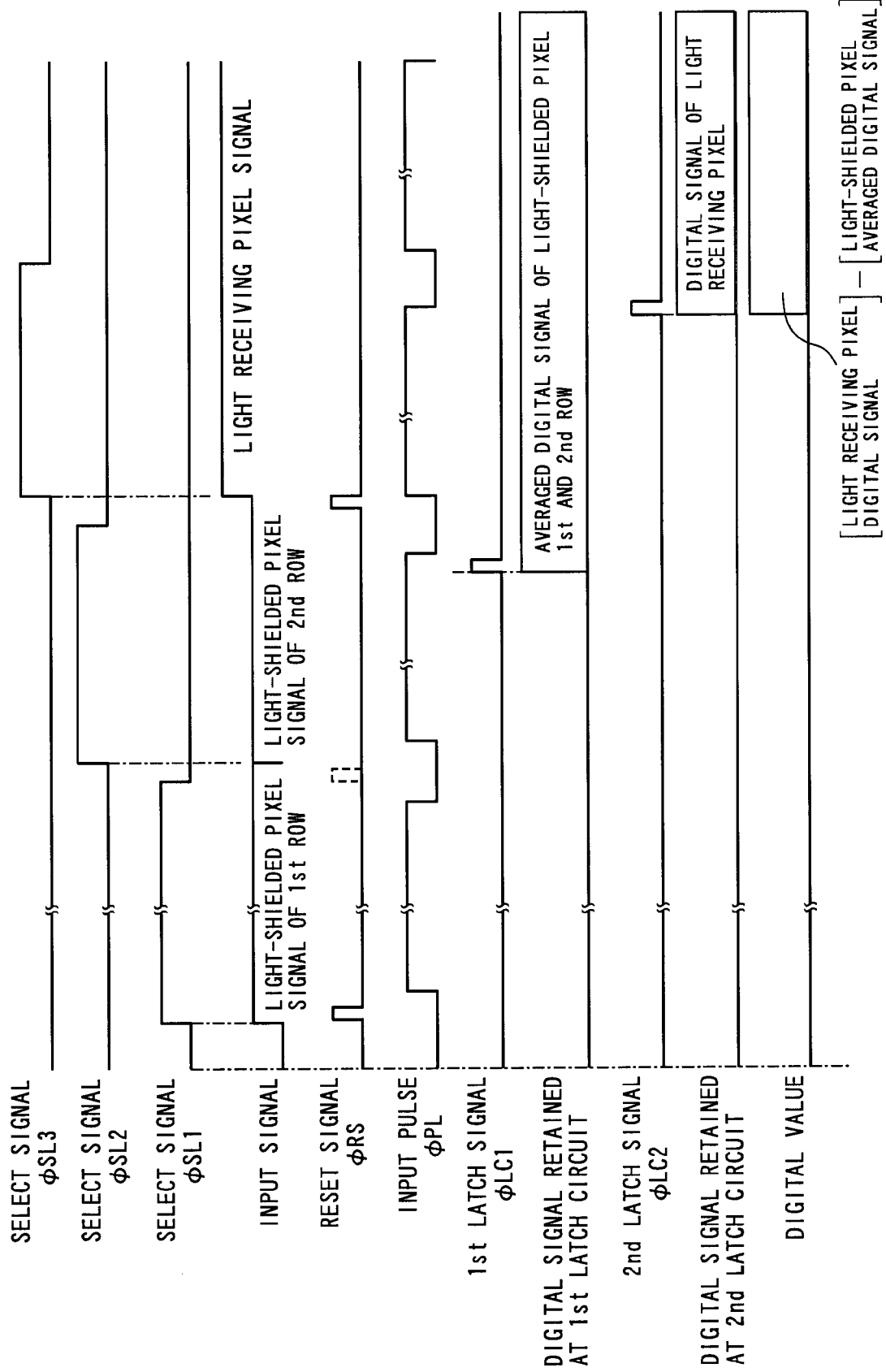
FIG. 9 is a timing chart for explaining an operation of the second embodiment shown in FIG. 7.

Next, the drive operation of the solid-state imaging apparatus according to the second embodiment shown in FIG. 7 will be described below with using a timing chart shown in FIG. 9. At first, by driving a pixel select signal φSL1 from the vertical scanning circuit 4 to High level, the light-shielded pixels 2 of the first row controlled by the pixel select signal φSL1 are selected so that signal of the light-shielded pixel 2 is outputted to the CDS circuit 5. At this time, other pixel select signals φSL2, φSL3, φSL4 are kept at Low level. Signals outputted from the light-shielded pixel 2 of the first row are two signals or the signal at the time of resetting that are outputted when the light-shielded pixel 2 is reset and the dark signal after releasing of the reset. At the CDS circuit 5, then, a signal (voltage) with noise at the time of resetting being suppressed is generated and outputted to the AD converter 202 by computing a difference between the voltages of the two signals.

On the other hand, the counter circuit 112 at the AD converter 202 is reset to initial state as the reset signal φRS is driven to High level and then brought to Low level. Subsequently, an input pulse φPL attains High level so that a pulse having a delay amount corresponding to difference from a reference voltage of the voltage of input signal inputted from the CDS circuit 5 based on such input pulse runs through the delay circuit 111. The counter circuit 112 counts the number of times the running pulse has circulated within the delay circuit 111. At the latch and encoder circuit 113, the number of running stages of the running pulse within the delay circuit 111 is detected. After passage of a certain period, the running of the pulse in the delay circuit 111 is halted by bringing the input pulse φPL to Low level. Subsequently, the count value counted at the counter circuit 112 and data obtained at the latch and encoder circuit 113 are processed at the adder 114 and are outputted from the adder 114 to the averaging circuit 118 as a digital signal corresponding to an output signal of the light-shielded pixel 2 of the first row. The pixel select signal φSL1 is then brought to Low level to end the reading of signal of the light-shielded pixels 2 of the first row.

Next, signals of the light-shielded pixels 2 of the second row are read out. By driving a pixel select signal φSL2 to High level, the light-shielded pixels 2 of the second row controlled by the pixel select signal φSL2 are selected so that a signal of the selected light-shielded pixel 2 is outputted to the CDS circuit 5. At this time, other pixel select signals φSL1, φSL3, φSL4 are kept at Low level. Signals outputted from the light-shielded pixel 2 of the second row are two signals or the signal at the time of resetting that are outputted when the light-shielded pixel 2 is reset and the dark signal after releasing of the reset. At the CDS circuit 5, then, a signal (voltage) with noise at the time of resetting being suppressed is generated and outputted to the AD converter 202 by computing a difference between the voltages of the two signals.

At the AD converter 202, the reset signal RS is first driven to High level and then brought to Low level to reset the counter circuit 112 to initial state. Subsequently, an input pulse φPL attains High level so that a pulse having a delay amount corresponding to a difference between the voltage of input signal inputted from the CDS circuit 5 and a reference voltage runs through the delay circuit 111. The counter circuit 112 counts the number of circulations of the running pulse within the delay circuit 111. At the latch and encoder circuit 113, the number of running stages of the running pulse within the delay circuit 111 is detected. After passage of a certain period, the running of the pulse within the delay circuit 111 is halted by bringing the input pulse φPL to Low. Subsequently, the count value counted at the counter circuit 112 and data obtained at the latch and encoder circuit 113 are processed at the adder 114 and are outputted from the adder 114 to the averaging circuit 118 as a digital signal corresponding to an output signal of the light-shielded pixel 2 of the second row. The pixel select signal φSL2 is then brought to Low level to end the reading of signal of the light-shielded pixels 2 of the second row.

The averaging circuit 118 then calculates a mean value of the digital signals of a plurality of the light-shielded pixel 2 inputted up to now (the light-shielded pixels 2 of the first row and the second row in the illustrated example) and outputs it to the first latch circuit 115. A first latch signal φLC1 is driven to High level and then brought to Low level, whereby the mean value obtained by averaging the digital signals of a plurality of the light-shielded pixel 2 at the averaging circuit 118 is retained as a reference digital signal at the first latch circuit 115.

Next, signals of the light receiving pixels 1 of the third row are read out. By driving a pixel select signal φSL3 to High level, the light receiving pixels 1 of the third row controlled by the pixel select signal φSL3 are selected, and a signal of the selected light receiving pixel 1 is outputted to the CDS circuit 5. At this time, other pixel select signals φSL1, φSL2, and φSL4 are kept at Low level. Outputted from the light receiving pixel 1 are two signals or a signal at the time of resetting outputted when the light receiving pixel 1 is reset and a light signal corresponding to a received light. At the CDS circuit 5, then, a signal (voltage) with noise at the time of resetting being suppressed is generated and outputted to the AD converter 202 by computing a difference between the voltages of the two signals.

At the AD converter 202, the counter circuit 112 is reset to initial state, as a reset signal φRS is at first driven to High level then brought to Low level. Subsequently, an input pulse φPL attains High level so that a pulse having a delay amount corresponding to a difference between the voltage of input signal inputted from the CDS circuit 5 and a reference voltage runs through the delay circuit 111. The counter circuit 112 counts the number of circulations of the running pulse within the delay circuit 111. At the latch and encoder circuit 113, the number of running stages of the running pulse within the delay circuit 111 is detected. After passage of a certain period, the running of the pulse in the delay circuit 111 is halted by bringing the input pulse φPL to Low level. Subsequently, the count value counted at the counter circuit 112 and data obtained at the latch and encoder circuit 113 are processed at the adder 114 and are outputted from the adder 114 as a digital signal corresponding to an output signal of the light receiving pixel 1.

By driving a second latch signal φLC2 to High level and then bringing it to Low level, the digital signal corresponding to the output signal of the light receiving pixel 1 outputted from the adder 114 is retained at the second latch circuit 116. Subsequently, the reference digital signal retained at the first latch circuit 115 and the digital signal retained at the second latch circuit 116 are subjected to subtraction at the adder 117, and the result is outputted in the order of columns selected by the horizontal scanning circuit 5 as a digital value of the light-receiving pixel 1. By thus subtracting the averaged digital signal of the light-shielded pixel 2 from the digital signal of the light receiving pixel 1, a more excellent image can be obtained.

Embodiment 3

Figure 10:
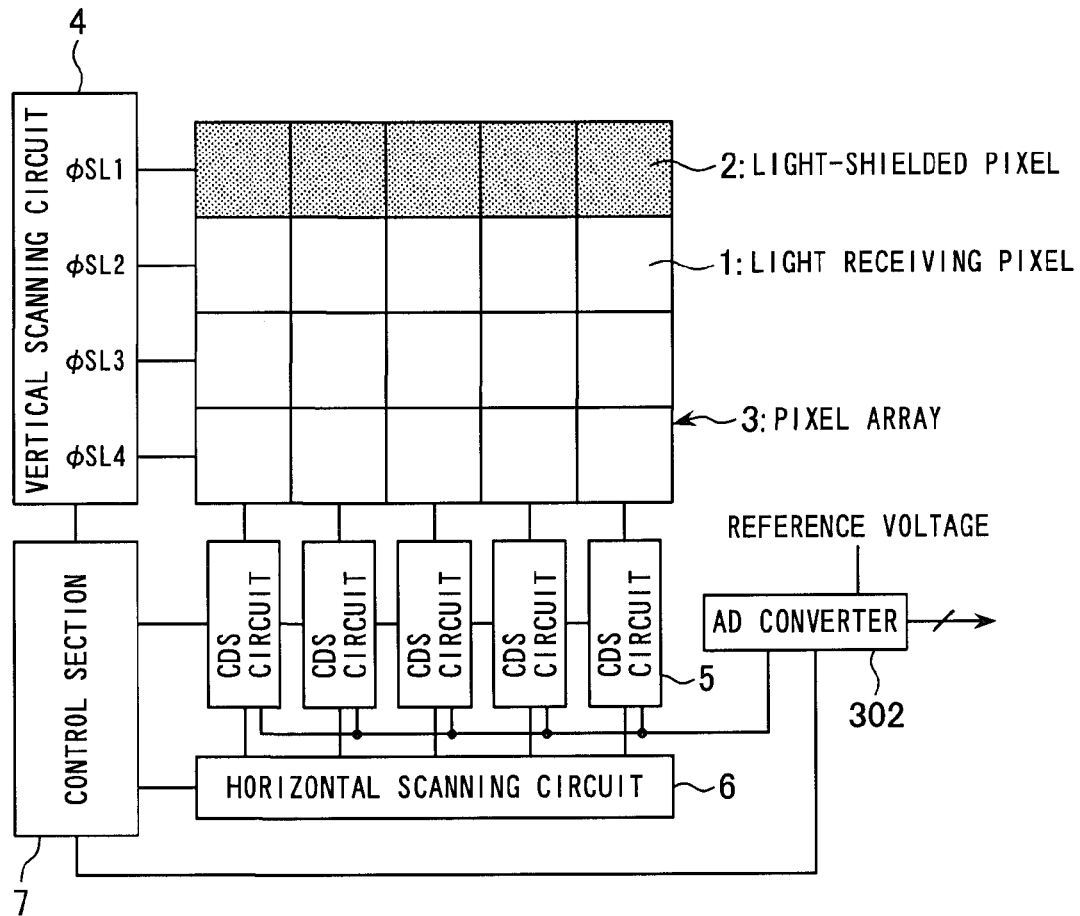
FIG. 10 is a block diagram showing a construction of the solid-state imaging apparatus according to a third embodiment of the invention.

A third embodiment of the invention will now be described. The construction of the solid-state imaging apparatus according to the third embodiment is shown in FIG. 10. The third embodiment is different in the disposition of the AD converter from the first embodiment and the second embodiment. In particular, while one AD converter 102 is disposed at every one column in the first embodiment and the second embodiment, one AD converter 302 in the third embodiment is disposed so as to be shared by a plurality of columns of the pixel array as shown in FIG. 10. The construction itself of the AD converter 302 according to the third embodiment shown in FIG. 10 is identical to the AD converter 102, 202 in the first embodiment or the second embodiment and will not be described. The number of AD converters is reduced by using such construction so that the solid-state imaging apparatus can be further reduced in size.

Embodiment 4

Figure 11:
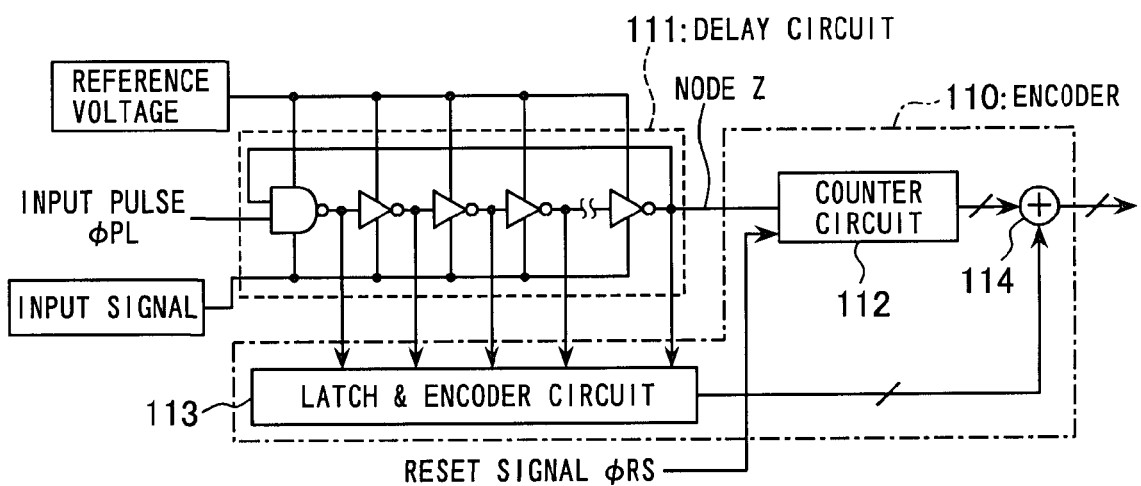
FIG. 11 is a circuit diagram showing a construction of a delay circuit within an AD converter in the solid-state imaging apparatus according to a fourth embodiment of the invention.

A fourth embodiment of the invention will now be described. FIG. 11 is a circuit diagram showing construction of the delay circuit 111 within an AD converter in the slid-state imaging apparatus according to the fourth embodiment. With the AD converter according to this embodiment, the input position of the input signal and the reference voltage with respect to the delay circuit 111 is different from that in the AD convert of the first to third embodiments. The rest of the construction of the AD converter and the solid-state imaging apparatus is identical to the first to third embodiments, and will not be described. It is also possible to construct the AD converter in this manner to obtain similar advantages as in the first to third embodiments.

Embodiment 5

Figure 12:
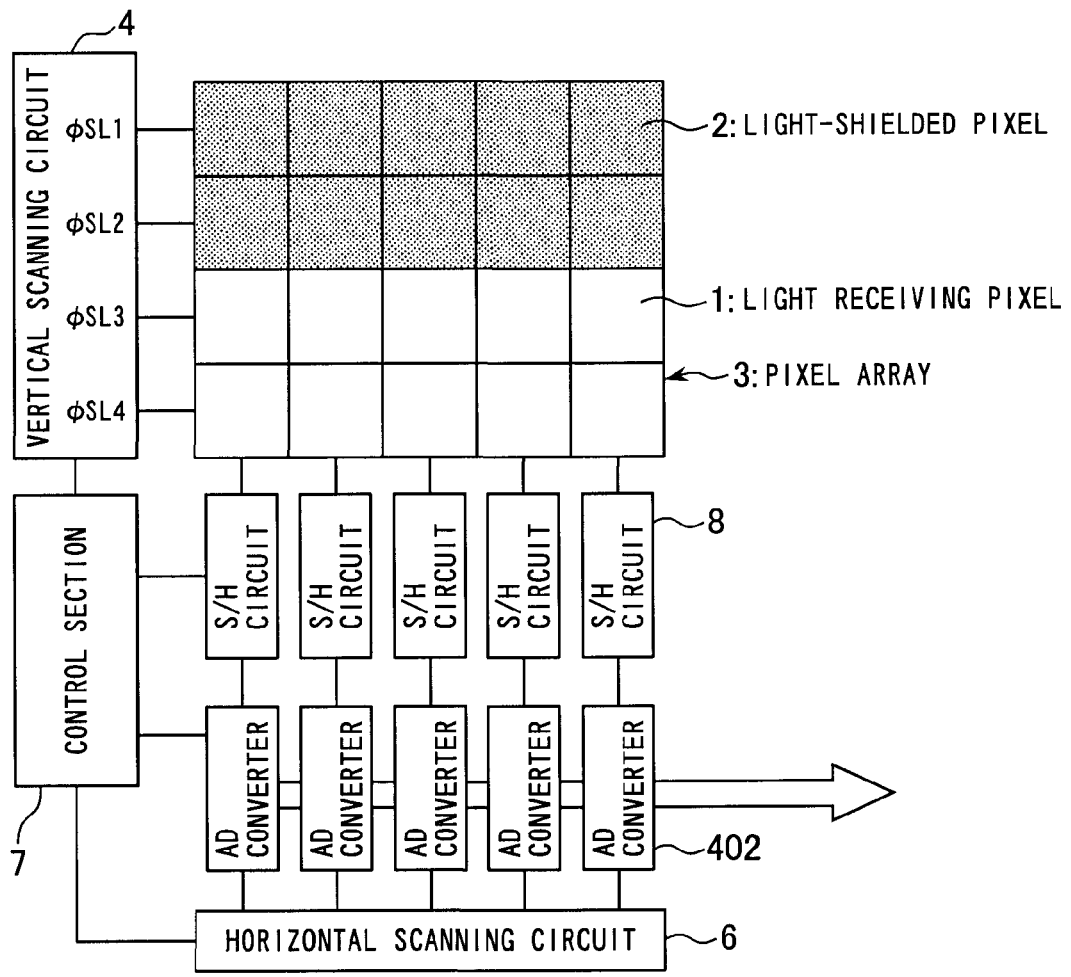
FIG. 12 is a block diagram showing a construction of the solid-state imaging apparatus according to a fifth embodiment of the invention.
Figure 13:
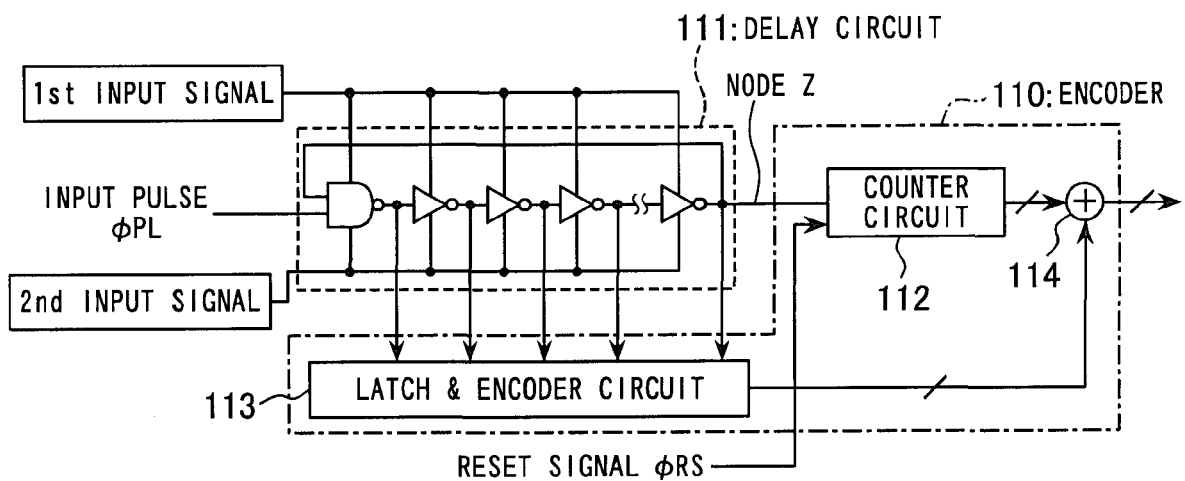
FIG. 13 is a circuit diagram showing a construction of a delay circuit within an AD converter in the fifth embodiment shown in FIG. 12.

A fifth embodiment of the invention will now be described. The construction of the solid-state imaging apparatus according to the fifth embodiment is shown in FIG. 12. The present embodiment is different in that, instead of the CDS circuit 5 in the solid-state imaging apparatus according to the foregoing embodiments, a sample-and-hold circuit (s/H circuit) 8 is provided to retain and output each of an output at the time of resetting of pixel and an output that is a dark output after releasing of the reset if the pixel is a light-shielded pixel 2 or that is an output corresponding to a received light if the pixel is a light receiving pixel 1. Further, it is different in that, to the delay circuit 111 of an AD converter 402, a second input signal can be inputted as shown in FIG. 13 instead of the reference voltage in the delay circuit 111 of the AD converter shown in the first embodiment to the fourth embodiment. It should be noted that the input signal in the AD converter shown in the first to fourth embodiments is taken as a first input signal in the fifth embodiment. It is thereby possible to make a pulse run through the delay circuit 111 as having a delay amount corresponding to the voltage of difference between the two or the first and second input signals.

An operation of the fifth embodiment having such construction will now be described. At first, a signal at the time of resetting of pixel (Signal 1) outputted when the light-shielded pixel 2 is reset or when the light receiving pixel 1 is reset is retained at the S/H circuit 8. A dark signal after releasing the reset of the light-shielded pixel 2 or a signal of pixel corresponding to light received by the light receiving pixel 1 (Signal 2) is then retained at the S/H circuit 8. Signal 1 and Signal 2 retained at the S/H circuit 8 are then inputted to the AD converter 402 respectively as the first input signal and the second input signal.

Thus at the AD converter 402: when the subject is a light-shielded pixel 2, a pulse having a delay amount corresponding to a difference between two signals that are the signal at the time of resetting outputted when the light-shielded pixel 2 is reset and the dark signal after releasing the reset runs through the delay circuit 111; and, when the subject is a light receiving pixel 1, a pulse having a delay amount corresponding to a difference between two signals that are the signal at the time of resetting outputted when the light receiving pixel 1 is reset and the light signal corresponding to received light runs through the delay circuit 111. The construction of the rest of the AD converter and the solid-state imaging apparatus is identical to the first to fourth embodiment and will not be described. Similar advantages as in the first to fourth embodiments can thus be obtained also when the S/H circuit 8 is used instead of the CDS circuit 5.

While both Signal 1 and Signal 2 in the present embodiment are retained at the S/H circuit 8 and then inputted to the delay circuit 111, it is also possible that only Signal 1 or Signal 2 be retained at the S/H circuit 8 and then inputted to the delay circuit 111 and the other signal be directly inputted to the delay circuit 111 as it is. While the delay circuit 111 in the above embodiments has been shown as one constituted by NAND circuit and INV circuit, it is obvious that any circuit construction in addition to the circuit construction of the above embodiments can be used if it is capable of generating a pulse having a delay amount corresponding to the difference between the voltage of input signal and the reference voltage.

As has been described by way of the above embodiments, it is possible according to the first aspect of the invention to keep smaller the respective bit number at the encoder, the first storage section, the second storage section, and the differential circuit so that the solid-state imaging apparatus can be reduced in size. According to the second aspect of the invention, a more excellent image can be obtained by subtracting an averaged count value of the first pixel from a count value corresponding to the second pixel. According to the third aspect of the invention, the construction can be made suitable for the solid-state imaging apparatus having a noise suppressing circuit. According to the fourth aspect of the invention, the construction can be made suitable for the solid-state imaging apparatus having a sample-and-hold circuit for retaining at least one of an output at the time of resetting of pixel (Output 1) and a dark output after releasing of the reset if the pixel is a first pixel or an output corresponding to received light if it is a second pixel (Output 2) so that Output 1 and Output 2 are inputted to the delay circuit at the same timing.

What is claimed is:

1. A solid-state imaging apparatus comprising:
    a pixel section having a first pixel shielded from light and a second pixel provided in a region over which an object image is formed;
    a delay circuit having delay devices connected into a multiple of stages for giving to a running pulse a delay amount corresponding to a difference between an analog output value of each pixel from said pixel section and an analog reference value;
    an encoder to be reset by the unit of pixel with sampling and encoding a running position of said pulse at every predetermined timing;
    a first storage section for retaining an encoded value corresponding to said first pixel;
    a second storage section for retaining an encoded value corresponding to said second pixel; and
    a differential circuit for computing and outputting as a digital pixel signal a difference between an output from said first storage section and an output from said second storage section.

2. The solid-state imaging apparatus according to claim 1, wherein said first storage section retains a count value obtained by averaging outputs from a plurality of said first pixel.

3. The solid-state imaging apparatus according to claim further comprising a noise suppressing circuit for outputting an analog signal that noises at the time of resetting said first pixel and said second pixel being suppressed, wherein the analog signal from said noise suppressing circuit is inputted to said delay circuit as said analog output value of each pixel.

4. The solid-state imaging apparatus according to claim 1, wherein said delay circuit uses an output at the time of resetting the pixel as said analog reference value and receives a light signal of the pixel corresponding to a light amount of an object as said analog output value.

* * * * *